United States Patent [19]

Hasenauer et al.

[11] Patent Number: 4,564,568
[45] Date of Patent: Jan. 14, 1986

[54] ELECTROCHEMICAL STORAGE CELL

[75] Inventors: Dieter Hasenauer, Weinheim; Kuno Hug, Heidelberg, both of Fed. Rep. of Germany

[73] Assignee: Brown, Boveri & Cie Aktiengesellschaft, Mannheim, Fed. Rep. of Germany

[21] Appl. No.: 667,871

[22] Filed: Nov. 2, 1984

[30] Foreign Application Priority Data

Nov. 9, 1983 [DE] Fed. Rep. of Germany ....... 3340424

[51] Int. Cl.[4] .......................................... H01M 10/39
[52] U.S. Cl. .................................... 429/104; 429/185
[58] Field of Search ............................... 429/104, 185

[56] References Cited

U.S. PATENT DOCUMENTS 4,048,393  7/1977  Heintz et al. ....................... 429/104
4,401,731  8/1983  Steinleitner ........................ 429/104
4,419,418  12/1983 Knodler et al. .................... 429/104
4,473,624  9/1984  Knodler ............................. 429/104

Primary Examiner—Donald L. Walton
Attorney, Agent, or Firm—Herbert L. Lerner; Laurence A. Greenberg

[57] ABSTRACT

Electrochemical storage cell based on alkali metal and chalcogen with an anodic space and a cathodic space which are separated from each other by an alkali ion-conducting solid electrolyte and are limited at least areawise by a metallic housing, and ceramic structural elements connected with metallic structural elements by thermocompression. The metallic structural elements connected with ceramic structural elements by thermocompression are very thin-walled at least in the joint region and are supported at least areawise by a reinforcement element of a metallic or non-metallic material.

12 Claims, 4 Drawing Figures

ELECTROCHEMICAL STORAGE CELL

BACKGROUND OF THE INVENTION

1. Field of the Invention

The invention relates to an electrochemical storage cell based on alkali metal and chalcogen with an anodic space and a cathodic space which are separated from each other by an alkali ion-conducting solid electrolyte and are limited at least areawise by a metallic housing, and ceramic structural elements connected with metallic structural elements.

2. Description of the Prior Art

Such electrochemical storage cells are being used increasingly in high-temperature storage batteries which serve as energy sources of electric vehicles.

Rechargeable electrochemical storage cells based on alkali metal and chalcogen, whose reactant spaces are separated from one another by a solid electrolyte, are eminently suitable for the construction of high-temperature storage batteries. The solid electrolytes used in the storage cells, made for example of beta aluminum oxide, have the special feature that the partial conductivity of the movable ions through them is very high, and the partial conductivity of the electrons is smaller by many powers of ten.

The use of such solid electrolytes in the construction of electrochemical storage cells results in practically no self-discharge taking place, as the electro conductivity is negligible, and also because the reaction substances cannot move across the solid electrolyte as neutral particles. One advantage of these storage cells is that no electrochemical side reactions occur during charging. The reason for this is again that only one type of ions can get through the solid electrolyte. The current yield of such a storage cell is therefore approximately 100%.

However, problems still occur with these storage cells in those areas in which ceramic and metallic structural elements are joined together. This is the case in particular in the area of the cell closure, where the insulating ring connected with the solid electrolyte is connected with the housing of the storage cell either directly or via an additional metallic structural element. German DE-OS No. 30 33 438 discloses an electrochemical storage cell in which the ceramic and metallic structural elements are joined together by the use of a thermocompression method. Flat aluminum elements, designed for example as annular disks, are placed between the two structural elements to be connected and serve as adhesion promoters. Since in this thermocompression process the structural elements to be connected are fitted together by aluminum in plastic flow under the action of pressure and heat, one must operate with an aluminum deformation of at least 50%. The structural elements used in the manufacture of the storage cell are preferably made of steel or special steel. The structural elements of the storage cell made of such materials tend to corrode very readily, thereby greatly reducing the longevity of a storage cell. In particular the effectiveness of the storage cell closure is greatly diminished by corroding parts, so that optimum seal of the storage cell from the outside, in particular of its reactant spaces, is no longer assured after a relatively short time.

SUMMARY OF THE INVENTION

It is, therefore, an object of the invention to provide a closure of a storage cell, in particular the connection of metallic and ceramic structural elements in the region of the closure, in which corrosion of the metallic structural elements is avoided and the storage cell can withstand the mechanical stresses occurring during operation.

With the foregoing and other objects in view, there is provided in accordance with the invention an electrochemical storage cell based on alkali metal and chalcogen comprising an anodic space for the alkali metal and a cathodic space for the chalcogen which are separated from each other by an alkali ion-conducting solid electrolyte and are limited at least areawise by a metallic housing, and ceramic structural elements connected with metallic structural elements by thermocompression, the combination therewith of metallic structural elements connected with ceramic structural elements by thermocompression wherein the metallic structural elements are thin-walled at least in the joint region and the thin walls are supported areawise by reinforcement elements.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
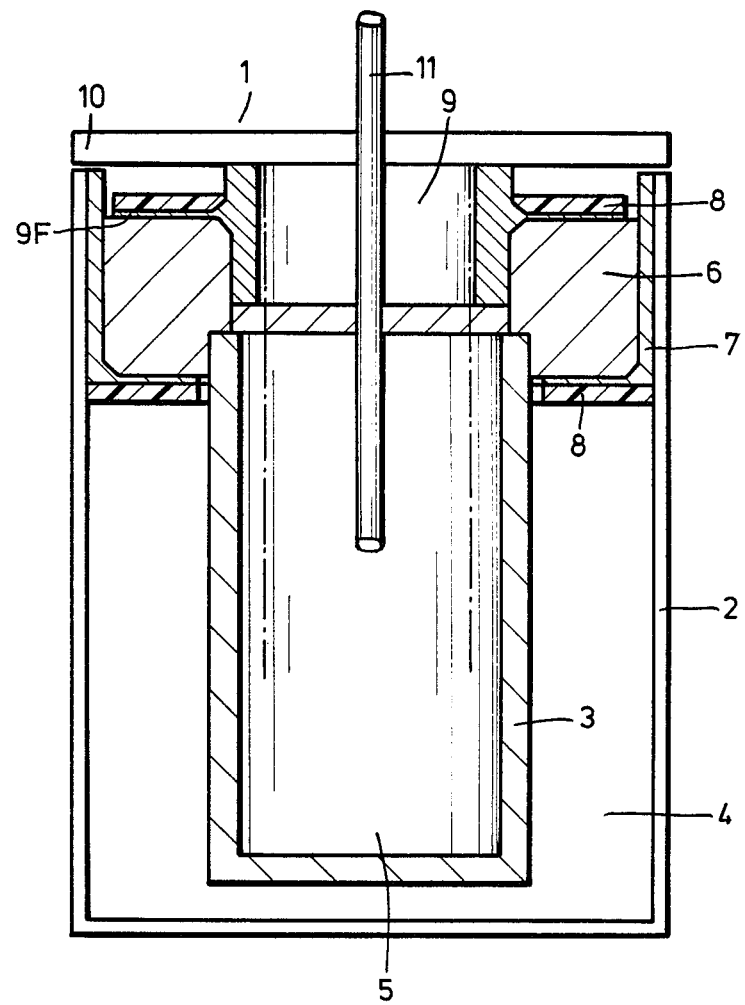
FIG. 1 illustrates an electrochemical storage cell in accordance with the invention showing particularly an insulating ring joined to metallic structural elements supported in the joint region by reinforcement elements

The invention relates to an electrochemical storage cell with an anodic space and a cathodic space which are separated from each other by a solid electrolyte and are bounded by a cup-shaped metallic housing. The solid electrolyte is also cup-shaped and has at its upper end an insulating ring of alpha-aluminum oxide. According to the invention, this insulating ring is connected with metallic structural elements by thermocompression, the structural elements being very thin-walled at least in the joint region and made of a pure aluminum. The thin-walled metallic structural elements are supported at least partially in the joining region by reinforcement elements. The reinforcement elements are made of highly heat-resistant or dispersion-hardened aluminum or of a non-conductive ceramic, in particular of alpha-aluminum oxide.

According to the invention, the metallic structural elements to be connected with the ceramic structural elements are made of pure aluminum. The reinforcement elements are made from dispersion-hardened aluminum or alpha-aluminum oxide. If the metallic and ceramic structural elements are joined together by radial thermocompression, reinforcement elements are used which are formed as rings split on one side. For radial thermocompression several separate parts made of the above named material may be used as reinforcement elements. When joining ceramic and metallic structural elements by axial thermocompression, perforated disks of dispersion-hardened aluminum or of alpha-aluminum oxide are preferably used. The reinforcement elements are connected with the structural elements of pure aluminum under high pressure at about 600° C. Simultaneously the metallic structural elements of aluminum are fitted together with the ceramic structural elements. In the joint area the metallic structural elements of aluminum have a wall thickness of only 0.1 to 0.3 mm. During the thermocompression process the metallic structural elements, in particular the aluminum, undergo plastic deformation. The aluminum of the structural elements bonds during the thermocompression with the ceramic structural elements, in particular with the insulating ring made of alpha-aluminum, or the solid electrolyte through a chemical bond. Simultaneously it welds directly to the reinforcement elements made of dispersion-hardened aluminum. Due to the fact that the metallic structural elements are made of aluminum, a short fabrication time is possible, and is greatly preferred over the use of metallic structural elements of steel or special steel. With the use of reinforcement elements made of alpha-aluminum oxide, hardly any deformation occurs under the action of the thermocompression, as they have a very high strength even when hot. In contrast to reinforcement elements of dispersion-hardened aluminum, reinforcement elements of alpha-aluminum oxide must have a greater wall thickness. The preferred thickness of these reinforcement elements is a wall thickness of 1 to 4 mm. This makes these reinforcement elements heavier and bulkier than reinforcement elements of dispersion hardened aluminum. But the same effect with respect to reinforcement of the metallic structural elements can be achieved with reinforcement elements of alpha-aluminum oxide, and if needed, in particular when the use of dispersion-hardened reinforcement elements of aluminum is not possible, an equally good bond is attainable by the use of reinforcement elements of alpha-aluminum oxide.

To obtain a continuous transition between the zones of thin wall thickness and the unreinforced zones of greater wall thickness of the same metallic structural elements, the thin-walled zones are beveled at the edge, in particular in the vicinity of the joint. The reinforcement elements are likewise beveled at these points. Thereby the deformed region of each aluminum structural element becomes thicker gradually, but is still supported by the reinforcement element in this transitional zone.

The invention will be explained below with reference to drawings.

The electrochemical storage cell 1 shown in FIG. 1 includes as essential elements, a metallic housing 2 and a solid electrolyte 3. The metallic housing 2 is made of aluminum and is cup-shaped. Inside the metallic housing 2 is disposed a cup-shaped solid electrolyte 3 made of beta-aluminum oxide. The dimensions of the electrolyte 3 are chosen to form between its outer walls and the inner walls of the housing 2 a continuous gap 4 all around the electrolyte. The gap 4 serves as a reactant space, in particular as the cathodic space. The cathodic space is filled with a sulfur-impregnated graphite (not shown here). The interior of the solid electrolyte 3 serves as a second reactant space, in particular as an anodic space, which is filled with sodium. The solid electrolyte 3 at its upper open end is connected with an insulating ring 6 made of alpha-aluminum oxide. The insulating ring 6 is connected with the solid electrolyte 3 by means of a glass solder (not shown here). The insulating ring 6 connected with the solid electrolyte 3 is shaped to form an outwardly directly flange. In order to mount the solid electrolyte 3 inside the storage cell, the insulating ring 6 is connected with the metallic housing indirectly. To this end the underside of the insulating ring 6 facing the cathodic space 4 and the lateral limiting wall thereof are surrounded by an L-shaped envelope 7 made of dispersion-hardened aluminum. Envelope 7 has a very thin wall at its bottom turned toward the cathodic space 4. The lateral limiting wall of envelope 7 is dimensioned to fill the space between the insulating ring 6 and housing 2. On the underside of envelope 7, in particular on the outer face of its bottom, is disposed a reinforcement element 8. In the embodiment here shown the reinforcement element 8 has the form of an annular disk and is made of dispersion-hardened aluminum. The upwardly directed edge of envelope 7 ends with the upper edge of the metallic housing 2. Envelope 7 is welded to the metallic housing 2. A storage vessel 9 for containing sodium, is placed on the solid electrolyte 3. The bottom of vessel 9 closes the interior of the solid electrolyte 3. Openings (not shown here) in the storage vessel 9 permit communication with the interior of the cell, in particular with the anodic space 5.

The storage vessel 9 has an outwardly directed flange 9F which, like the storage vessel 9, is made of pure aluminum. Flange 9F has very thin walls and is arranged so that it can be supported on the surface of the insulating ring 6. On flange 9F an additional reinforcement element 8 in the form of an annular disk is disposed. In the zone in which flange 9F is connected with the storage vessel 9, the wall thickness of flange 9F becomes gradually thicker. In this zone the annular disk 8 is beveled, thereby covering and supporting the gradually thickening zone of flange 9F. The storage cell 1 is closed at the top by a cover plate 10 which rests on the upper edge of the metallic housing 2 and of the storage vessel 9 and is firmly connected with them, to tightly seal the storage cell from the outside. An anodic current collector 11 in the form of a rod extends into the interior of the solid electrolyte 3. The rod passes through the storage vessel 9 and through the cover plate 10 of the storage cell 1 and projects above the cover plate 10 by several millimeters.

Figure 2:
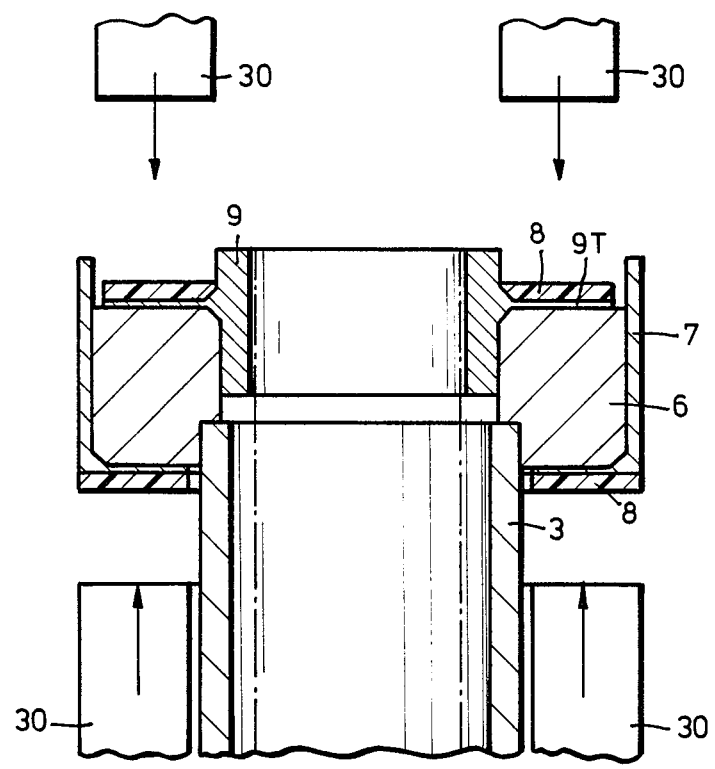
FIG. 2 shows the production of the storage cell in accordance with the invention, in particular thermocompression of the insulating ring to the metallic structural elements.

The ceramic and metallic structural elements of the storage cell are joined together by thermocompression. FIG. 2 shows the connection of the insulating ring 6 with the L-shaped envelope 7 and with flange 9F of vessel 9 as well as the simultaneous connection of a lower reinforcement element 8 with envelope 7 and an upper reinforcement element 8 with flange 9F. In particular FIG. 2 shows the solid electrolyte 3 with the storage vessel 9 placed on the electrolyte 3. The insulating ring 6, which is connected with the solid electrolyte 3 through a glass solder (not shown here), is surrounded by the L-shaped envelope 7 as described above. Flange 9F of vessel 9 rests on the insulating ring 6. A reinforcement element 8 is set against the underside of envelope 7, while another second reinforcement element 8 rests on flange 9F. In the manufacture of the storage cell, the structural elements shown here are first joined by thermocompression. Press rams 30 are used for this purpose. Such press rams are disposed above the reinforcement element 8, which rests on flange 9F. As can be seen with reference to FIG. 2, additional press rams 30 are arranged so that they can be pressed against the underside of the second reinforcement element 8, which is set against the underside of envelope 7. These press rams 30 are pushed against the reinforcement elements 8 with a very strong force and at a temperature of about 600° C. Thereby a firm connection is obtained between the insulating ring 6 and envelope 7 as well as flange 9F. At the same time one reinforcement element 8 is connected with envelope 7 and another element 8 is connected with flange 9F also in a durable manner. After the insulating ring 6 is thus connected with the envelope 7 and with the storage vessel 9, the solid electrolyte 3 together with these structural elements is inserted into the metallic housing 2. Thereafter the upper edge of envelope 7 is welded to the upper edge of the metallic housing. Before insertion of the solid electrolyte 3, the cathodic space 4 is filled with graphite and sulfur. The storage cell 1 is sealed with the cover plate 10 after the anodic space and the storage vessel 9 have been filled with sodium.

Figure 3:
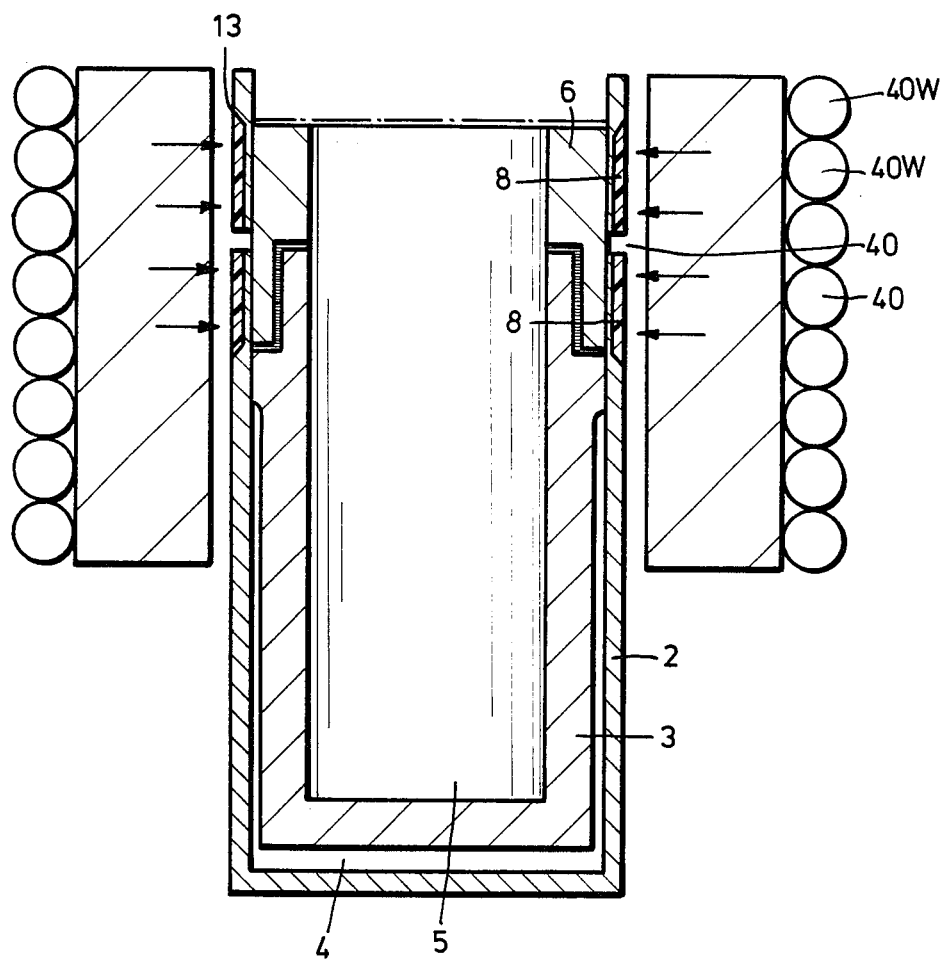
FIG. 3 is a variant of the storage cell in accordance with the invention.

In the variant of the storage cell 1 shown in FIG. 3, a metallic housing 2 which is cup-shaped and made of aluminum encloses the cell. A solid electrolyte 3 of beta-aluminum oxide is disposed inside the metallic housing 2. A gap 4 as a reaction space between the solid electrolyte 3 and metallic housing 2 is provided similar to that shown in FIG. 1. The insulating ring 6 is glazed onto the solid electrolyte 3 at its upper open end. The insulating ring 6 forms a flange pointing outward, which flange is directly connected with the metallic housing 2 of the storage cell using the thermocompression process. The metallic housing 2 is of a special design in the region of the insulating ring 6. The wall thickness of the metallic housing 2 is reduced to about half in this region. In the embodiment illustrated in FIG. 3 this is achieved by providing a U-shaped depression which has a height adapted to the height of the insulating ring 6. The lateral limiting faces of the U-shaped depression are beveled to cause the U-shaped depression to widen outwardly. The inside diameter of the annular reinforcement element 8 is adapted to the outside diameter of the metallic housing 2 in the region of the U-shaped depression 13. The two annular reinforcement elements are separated from each other in the center of the U-shaped depression 13 by a gap a few millimeters wide. The annular reinforcement elements 8 are likewise beveled in the region of the lateral limiting faces of the U-shaped depression 13, such that the beveled faces of elements 8 apply against the lateral limiting faces of the U-shaped depression 13. The thickness of the two reinforcement elements 8 is chosen so that their outer faces lie in one plane with the lateral outer face of the metallic housing 2.

The metallic housing 2 is connected both with the insulating ring 6 and with the reinforcement elements 8 by applying the thermo-compression process. The pressing pressure required for the thermo-compression is created with a magnetic coil 40, which is arranged so that its turns 40W are perpendicular to the longitudinal axis of the metallic housing 2. If the turns 40W of the magnet coil are traversed by a correspondingly strong coil current, a considerably high maxwellian pressure will develop. This pressure is directed perpendicularly onto the outer faces of the reinforcement elements 8. By disposing an appropriate tool (not shown here) in the interior of the solid electrolyte 3 a corresponding counter-pressure can be created, so that the reinforcement elements 8 as well as the insulating ring 6 can be connected with the metallic housing 2 in one operation. With the appropriate pressure forces, a temperature of about 600° C. is needed for the joining of the structural elements.

The joining of these structural parts occurs following the filling of the cathodic space 4 provided between the solid electrolyte 3 and the metallic housing 2. The filling in the cathodic space is a sulfur-impregnated graphite felt (not shown here). After the joining of the structural elements by the thermocompression process, the anodic space 5 is filled with sodium. The interior of the solid electrolyte 3 is utilized as the anodic space 5. The anodic space 5 in the embodiment shown here is filled with sodium (not shown). The storage cell is closed for example by a cover plate (not shown here), which is durably connected with the upper edge of the metallic housing 2. The cathodic space 4 is closed by the insulating ring 6, which extends up to the metallic housing 2, whereby a secure separation between the two reactant spaces is obtained.

Figure 4:
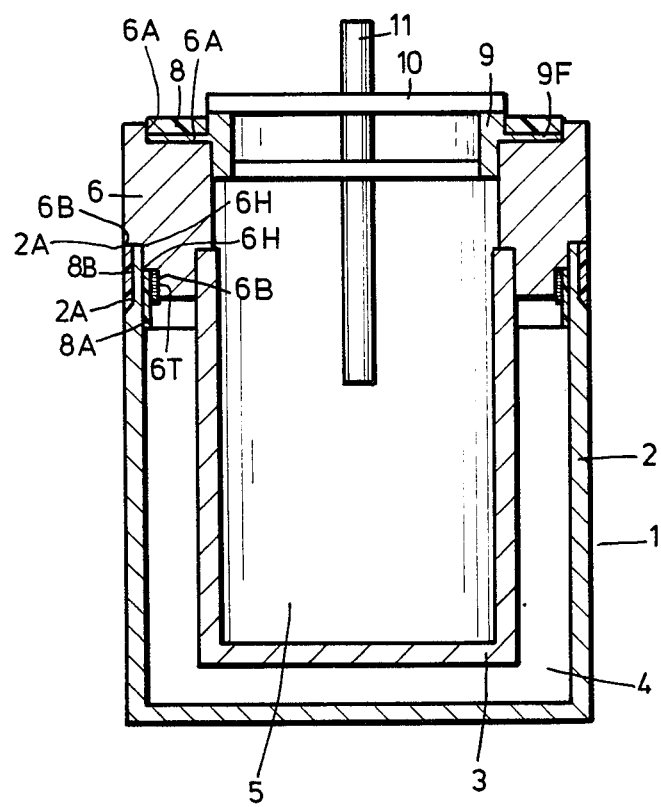
FIG. 4 is another form of the storage cell in accordance with the invention.

FIG. 4 shows a storage cell 1 which likewise has a metallic housing 2 with a solid electrolyte 3 in the interior of the housing 2. The metallic housing 2 is cup-shaped and made of aluminum. The solid electrolyte 3 is also cup-shaped and made of beta-aluminum oxide. As distinguished from the embodiments of storage cells illustrated in FIGS. 1 to 3, the variant here shown and described is not completely limited by the metallic housing. Instead, the latter extends only to the center of the insulating ring 6 connected with the solid electrolyte 3. The insulating ring 6 is glazed to the upper end of the solid electrolyte 3 and forms an outwardly directed flange. The dimensions of the insulating ring are chosen so that it can be placed and supported by its upper part on the top edge of the metallic housing 2. The cathodic space between housing 2 and solid electrolyte 3 is thereby tightly sealed. In this embodiment, too, the cathodic space 4 is filled with a sulfur-impregnated graphite (not shown here). On its upwardly facing limiting wall the insulating ring 6 is provided with an annular recess. A second recess 6B exists in the lower lateral limiting zone of the insulating ring 6. This recess 6B is stepped and its dimensions are such that it can receive both the upper end of the metallic housing 2 and two additional reinforcement elements 8A and 8B. As can be seen from FIG. 4, the cylindrical reinforcement element 8A is embedded in the lower step portion 6T. The second half of element 8A projects over the lower limiting face of the insulating ring 6 and into the cathodic space 4. In the higher step portion 6H of recess 6B is disposed the upper end of the metallic housing 6 as well as a second cylindrical reinforcement element 8B. The wall thickness of the metallic housing at the upper end thereof is reduced to about half, namely that in the outer face of the metallic housing a peripheral recess 2A is formed, into which the reinforcement element 8B is embedded. The thickness of the second reinforcement element 8B, arranged in recess 2A, is chosen so that the outer limiting face of the reinforcement element 8B is aligned with the lateral limitation of the insulating ring 6. The lateral limitation of recess 2A is beveled so that recess 2A widens outwardly. The reinforcement element 8B arranged in recess 2A is likewise beveled in this region, so that it is flush with the limiting faces of recess 2A. The bevel or recess 2A results in a continuous transition from the normal wall thickness of the metallic housing into the thinner end region with, however, a reinforcement adapted to bring about the corresponding wall thickness. As can be seen from FIG. 4, the upper end of the metallic housing is supported in its lower portion by the reinforcement element 8A and in its upper portion by the reinforcement element 8B. The joining of the metallic housing 2 to the insulating ring 6 and to the reinforcement elements 8A and 8B occurs by a radially directed thermocompression, which again can be carried out by the action of maxwellian pressure forces. The outwardly directed flange 9F of a storage vessel 9 is arranged in the recess 6A present in the end face of insulating ring 6. The storage vessel 9 filled with sodium is connected through openings (not shown here) with the interior of the solid electrolyte 3, which serves as the anodic space 5. A reinforcement element 8 in the form of an annular disk and which has the same width as flange 9F is arranged on flange 9F. Flange 9F is connected with the insulating ring 6 and with the reinforcement element 8 by the action of a perpendicular directed thermocompression, in particular by the action of pressure rams 30 as shown in FIG. 2. The reinforcement elements 8, 8A and 8B used in the embodiment shown here are made of dispersion-hardened aluminum. If circumstances so require, the reinforcement elements may also be made of a ceramic, in particular alpha aluminum oxide. Flange 9F of the storage vessel 9 is made of aluminum. Its thickness is about half the wall thickness of the rest of the storage vessel 9, which, like flange 9F, is made of pure aluminum. The storage vessel is closed by a cover plate 10, which is also made of aluminum and connected with the remaining part of storage vessel 9. One end of an anodic current collector in the form of a rod 11 protrudes into the interior of the anodic space 5. The other end of rod 11 is passed through the storage vessel 9 and projects a few millimeters above the cover plate 10 of the storage cell.

The invention is not limited to the embodiments illustrated in FIGS. 1 to 4. Rather it comprises all storage cells where ceramic structural elements are connected with thin-walled metallic structural elements, in particular of aluminum, the thin-walled metallic structural elements being supported by reinforcement elements of dispersion-hardened aluminum or of a nonconductive ceramic. As can be seen from the embodiments, the reinforcement elements not only serve to support the metallic thin-walled structural elements, but function also to keep corrosive reactants or reaction products away from the thin-walled metallic structural elements.

The foregoing is a description corresponding, in substance, to German application No. P 33 40 424, dated Nov. 9, 1983, International priority of which is being claimed for the instant application, and which is hereby made part of this application. Any material discrepancies between the foregoing specification and the specification of the aforementioned corresponding German application are to be resolved in favor of the latter.

We claim:

1. Electrochemical storage cell based on alkali metal and chalcogen comprising an anodic space for the alkali metal and a cathodic space for the chalcogen which spaces are separated from each other by an alkali ion-conducting solid electrolyte and are limited at least area-wise by a metallic housing, and ceramic structural elements connected with metallic structural elements by thermocompression, the combination therewith of metallic structural elements connected with ceramic structural elements by thermocompression to form joints, wherein the metallic structural elements made of aluminum are in the joint region reduced in thickness and made thin-walled with a thickness of at most 0.5 mm, and the thin walls are supported area-wise by reinforcement elements arranged in the joint region.

2. Electrochemical storage cell according to claim 1, wherein the reinforcement elements are made of heat-resistant aluminum.

3. Electrochemical storage cell according to claim 1, wherein the reinforcement elements are made of alpha-aluminum oxide.

4. Electrochemical storage cell according to claim 1, wherein the reinforcement elements are made of dispersion-hardened aluminum.

5. Electrochemical storage cell according to claim 1, wherein the reinforcement elements for axial thermocompression are perforated disks.

6. Electrochemical storage cell according to claim 1, wherein the reinforcement elements for axial thermocompression are annular disks.

7. Electrochemical storage cell according to claim 1, wherein the reinforcement elements for radial thermocompression are rings split on one side.

8. Electrochemical storage cell according to claim 1, wherein the reinforcement elements for radial thermocompression are ring segments.

9. Electrochemical storage cell based on alkali metal and chalocogen, comprising: a metallic housing which is cup-shaped and made of aluminum enclosing the cell, a cup-shaped solid electrolyte of beta-aluminum oxide disposed inside the metallic housing, a gap as a reaction space between the solid electrolyte and the metallic housing, an insulating ring glazed onto the solid electrolyte at its upper open end with the insulating ring forming a flange pointing outward, which flange is directly connected with the metallic housing by thermocompression to form a joint, said metallic housing of aluminum having a reduced thickness in the joint region with the thinner housing wall supported area-wise by a reinforcement element in the joint region.

10. Electrochemical storage cell according to claim 9, wherein the housing wall of reduced thickness is in the form of a U-shaped depression which has a height adapted to the height of the insulating ring, and two annular reinforcement elements separated from each other by a small gap are disposed in the depression, with the outer faces of the reinforcement elements lying in one plane with the lateral outer face of the metallic housing.

11. Electrochemical storage cell based on alkali metal and chalocogen, comprising: a cup-shaped metallic housing made of aluminum, a cup-shaped solid electrolyte of beta-aluminum oxide disposed inside the metallic housing, a gap as a reaction space between the solid electrolyte and the metallic housing, an insulating ring glazed onto the solid electrolyte at its upper open end with the insulating ring forming a flange pointing outward, which flange is directly connected with the metallic housing by thermocompression to form a joint, said metallic housing extending to a height intermediate the height of the insulating ring, said metallic housing of aluminum having a reduced thickness in the joint area with the thinner housing wall supported area-wise by a reinforcement element in the joint area.

12. Electrochemical storage cell according to claim 11, wherein the insulating ring is provided with an outer annular recess and an inner annular recess disposed lower but overlapping with the outer recess an dimensioned to receive the thinner housing wall between the two recesses with a cylindrical reinforcement element in the outer recess and a second cylindrical reinforcement element in the inner recess.

* * * * *